United States Patent Office 3,290,073
Patented Dec. 6, 1966

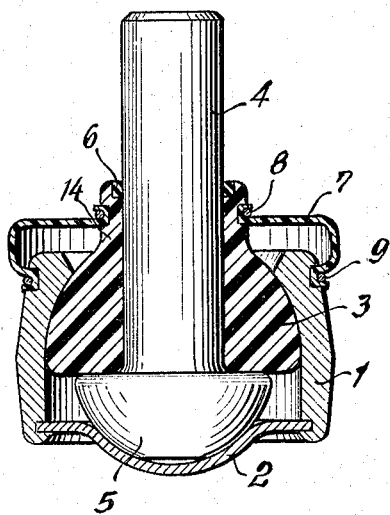
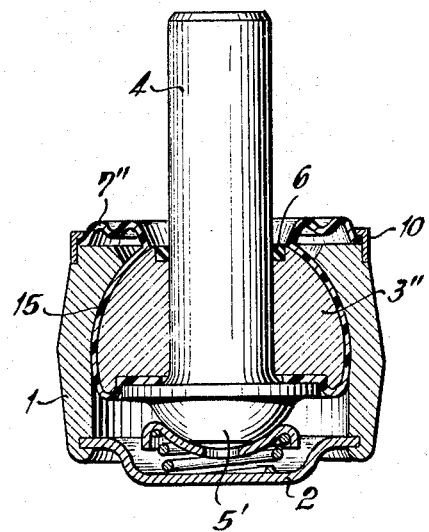
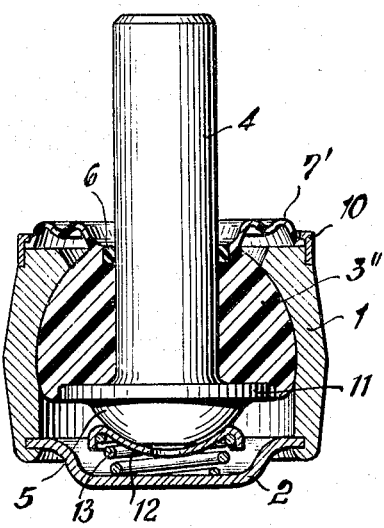

3,290,073
BALL AND SOCKET JOINTS
Rudolf Gottschald, Osterath, Germany, assignor to Viktor Langen, Dusseldorf-Oberkassel, Germany, sole responsible partner of the firm, A. Ehrenreich & Cie, Dusseldorf-Oberkassel, Germany
Filed July 12, 1963, Ser. No. 294,694
Claims priority, application Germany, July 14, 1962, E 23,205
3 Claims. (Cl. 287—90)

This invention relates to ball-and-socket joints of the kind having a ball in the form of a spherical segment mounted in a housing forming the socket, and a ball pin which passes into the housing and through the ball. The pin, which is prevented from being withdrawn through the ball by a collar or head and is sealed to the housing, is rotatable in the ball and is rockable with the ball in the housing.

A bellows-like seal is usually provided in such joints at the exit of the pin from the housing, such seal bearing against the housing at one end and against the pin at the other end. Since the pin must perform both a rotary movement and an angular or tumbling movement with respect to the housing, it is very difficult to provide perfect sealing between the housing and the pin, particularly if the pin is to perform relatively large angular movements.

The principal object of the invention is to obviate this disadvantage and to this end, according to the invention, two separate seals are provided at the exit of the pin from the housing, one seal being disposed between the ball and the housing while the other is disposed between the ball and the pin. In this way the sealing for the various surfaces associated with the rotary movements and the rocking or angular movements of the pin is associated with the different seals.

The seal provided for the pin rotating relatively to the ball may, for example, be a sealing ring in the form of a Simmer ring, while the seal between the ball and the housing may be a bellows-type seal. The particular advantage of this bellows-type seal over the bellows seals otherwise used in ball-and-socket joints is that the bellows seal can be much smaller because it is not subject to any stretching.

If the ball is made of a resilient material, the seal between the ball and the housing may be made by a part, such as bellows, which is integral with the ball.

If the ball is provided with a covering of resilient material, the seal between the ball and the housing may then be formed by a part, such as a bellows which is integral with the resilient covering of the ball.

Three examples of a joint constructed in accordance with the invention are illustrated in the accompanying drawing, in which:

FIGURE 1 is a central longitudinal section through the first joint;

FIGURE 2 is a similar section through the second joint; and,

FIGURE 3 is a similar section through the third joint.

In all three examples, the joints have a housing forming the socket which is closed at one side by a cover 2. A ball pin 4 is provided with a ball in the form of a spherical segment through which the pin 4 is fitted.

In FIGURE 1 the spherical segment is denoted by reference 3, in FIGURE 2 by 3' and in FIGURE 3 by 3". The spherical segment rests in a concave surface of the housing at the side where the pin leaves the housing. The pin is formed with a collar which bears against the spherical segment, the collar being denoted by reference 5 in FIGURE 1 and by 5' in FIGURES 2 and 3.

In the example shown in FIGURE 1, the collar 5 has a spherical surface on the side remote from the ball 3 in direct contact with a spherical part of the cover 2, while in the examples shown in FIGURES 2 and 3 the collar has a flange 11 which seats a recess in the ball element 3' and 3" and also has a spherical surface on the side remote from the pin. A correspondingly spherical plate 12 bears against the spherical collar surface and is supported against the cover 2 by a coil spring 13.

The collar surface adjacent the cover 2 may also have a different shape and, for example, be flat, while a resilient supporting element may be disposed between the collar surface and the cover.

A seal is provided between the ball and the pin 4 and another seal is provided between the housing and the ball.

In the first example, the ball 3 which may, for example, be of resilient material has an extension 14 which passes through the aperture where the pin 4 leaves the housing. A sealing ring 6, for example a Simmer ring, is provided as a seal at the end of the extension between the ball 3 and the pin 4. A bellows seal 7 is provided between the housing 1 and the spherical segment 3. The bellows is secured to the extension 14 of the ball 3 by a clamp ring 8 and is secured to the housing 1 by a clamp ring 9.

In the second example, the ball 3' is of resilient material. The sealing ring 6, for example a Simmer ring, is inserted into the ball 3' for sealing with respect to the pin 4. The bellows 7' forming the seal between the ball and the housing 1, is formed integrally with the ball 3' and is secured to the housing by a sheet-metal ring 10 which is pressed over the housing.

In the third example, the ball 3" is of hard material, for example steel, and is provided with a resilient covering 15. The bellows 7" is formed integrally with the resilient covering and is secured to the housing in the same way as in the second example. The ball is also sealed to the pin in the same way as in FIGURE 2 by means of a sealing ring 6 inserted into the ball.

With hitherto conventional seals, the seals have not been perfectly secure. The bellows-type seal previously used had to be so secured to the pin and the housing as so to permit a rotary movement of the pin with respect to the housing with the bellows. There may be perfect sealing in the central position but when the pin is deflected and is rotated in the deflected position the bellows does not slide but is subjected to considerable extension. If the bellows does slide then it no longer bears sufficiently tightly against the pin in the central position to ensure adequate sealing. The invention mitigates these disadvantages.

I claim:
1. A ball and socket joint comprising in combination a hollow housing having a bore extending therethrough, said housing having an inturned segmental spherical wall portion at one end of said bore defining a restricted opening,
closure means at the other end of said bore,
a first ball part having a segmental spherical outer surface, a flat end and a bore extending therethrough,
said segmental spherical outer surface of said first ball part engaging said segment spherical wall portion of said housing,
a joint stud having a shaft extending through said bore of said first ball part,
a second segmental spherical ball part at the end of said joint stud disposed in said housing and having a flat surface engaging said flat end of said first ball part, said first ball part having an extension including a bore slidably receiving said stud and being substantially contiguous with said bore of said first ball part, said extension projecting beyond said opening outwardly of said housing, said extension having an annular recess therein adjacent said stud.

a flexible sealing means having one end secured to said extension and the other end secured to the outer edge of said housing adjacent said one end of said bore, an O-ring sealing means between said joint stud and said extension on said first ball part permitting rotary motion of said stud around its axis, said O-ring sealing means being located within said recess.

2. A ball and socket joint as defined in claim 1 wherein said extension is integral with said first ball part.

3. A ball and socket joint as defined in claim 1 wherein said first ball part is formed of resilient material.

References Cited by the Examiner

UNITED STATES PATENTS

| 1,923,601 | 8/1933 | Weaver. | |
| 3,120,746 | 2/1964 | Kayser | 287—87 X |

FOREIGN PATENTS

| 216,806 | 8/1958 | Australia. |
| 118,170 | 8/1918 | Great Britain. |
| 895,068 | 4/1962 | Great Britain. |

OTHER REFERENCES

German application 1,060,203, June 25, 1959.

CARL W. TOMLIN, *Primary Examiner.*

THOMAS F. CALLAGHAN, *Examiner.*

A. V. KUNDRAT, *Assistant Examiner.*